June 29, 1926.
F. E. PERNOT
1,590,951
ELECTRICAL SIGNALING METHOD
Filed March 10, 1923   3 Sheets-Sheet 1
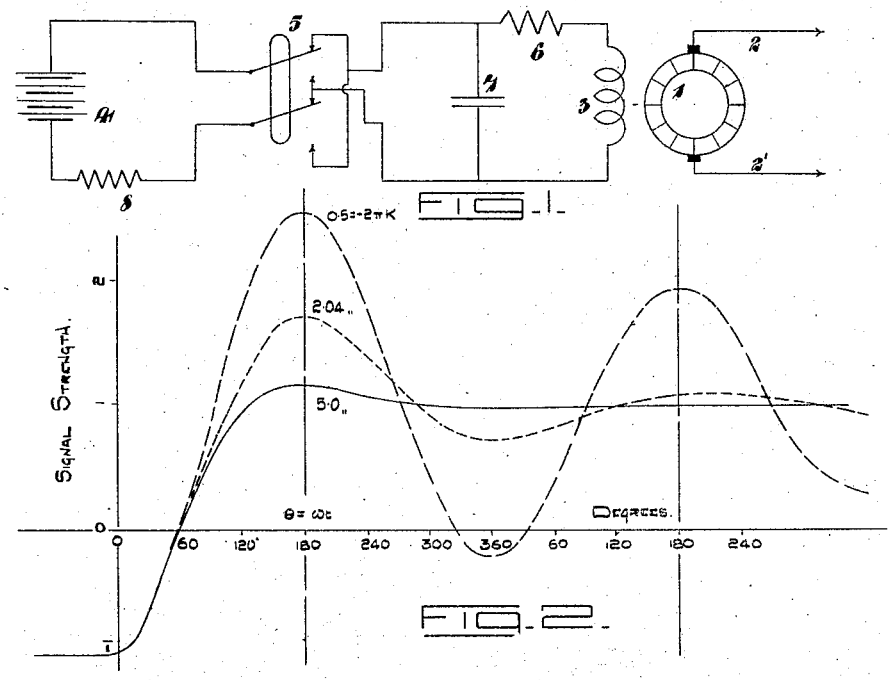
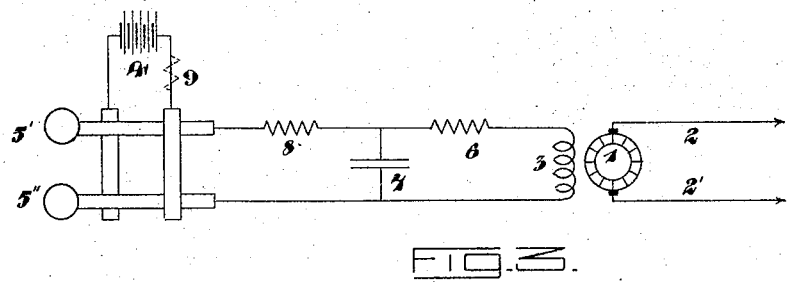
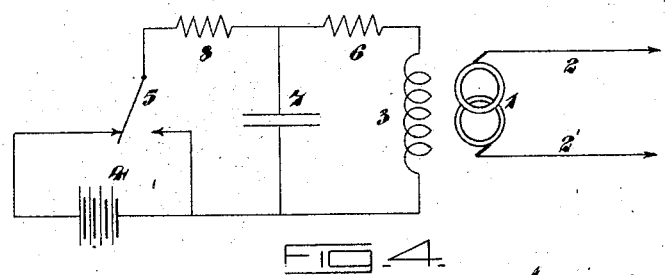
Inventor:
Frederick Eugene Pernot
By John S. Barker

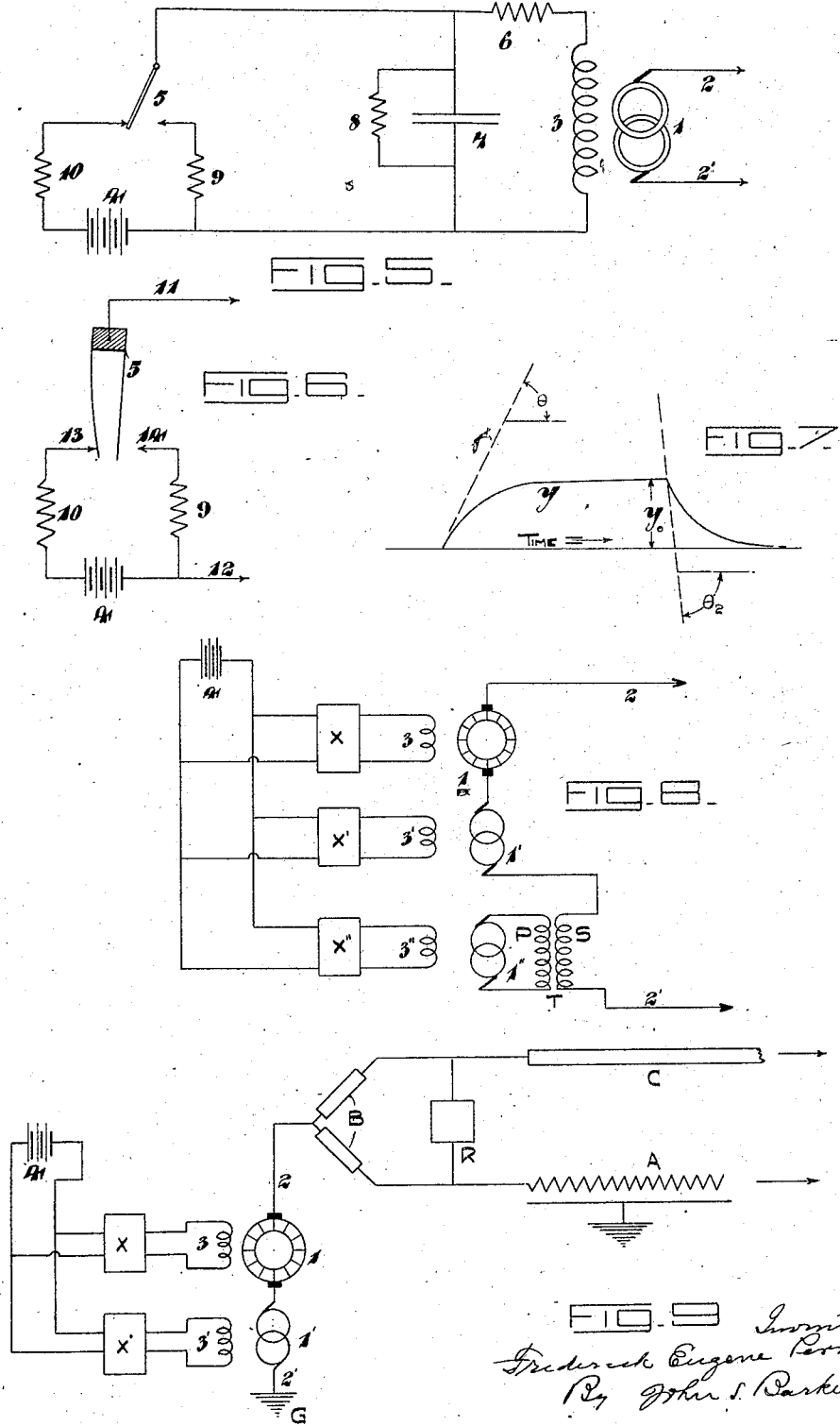

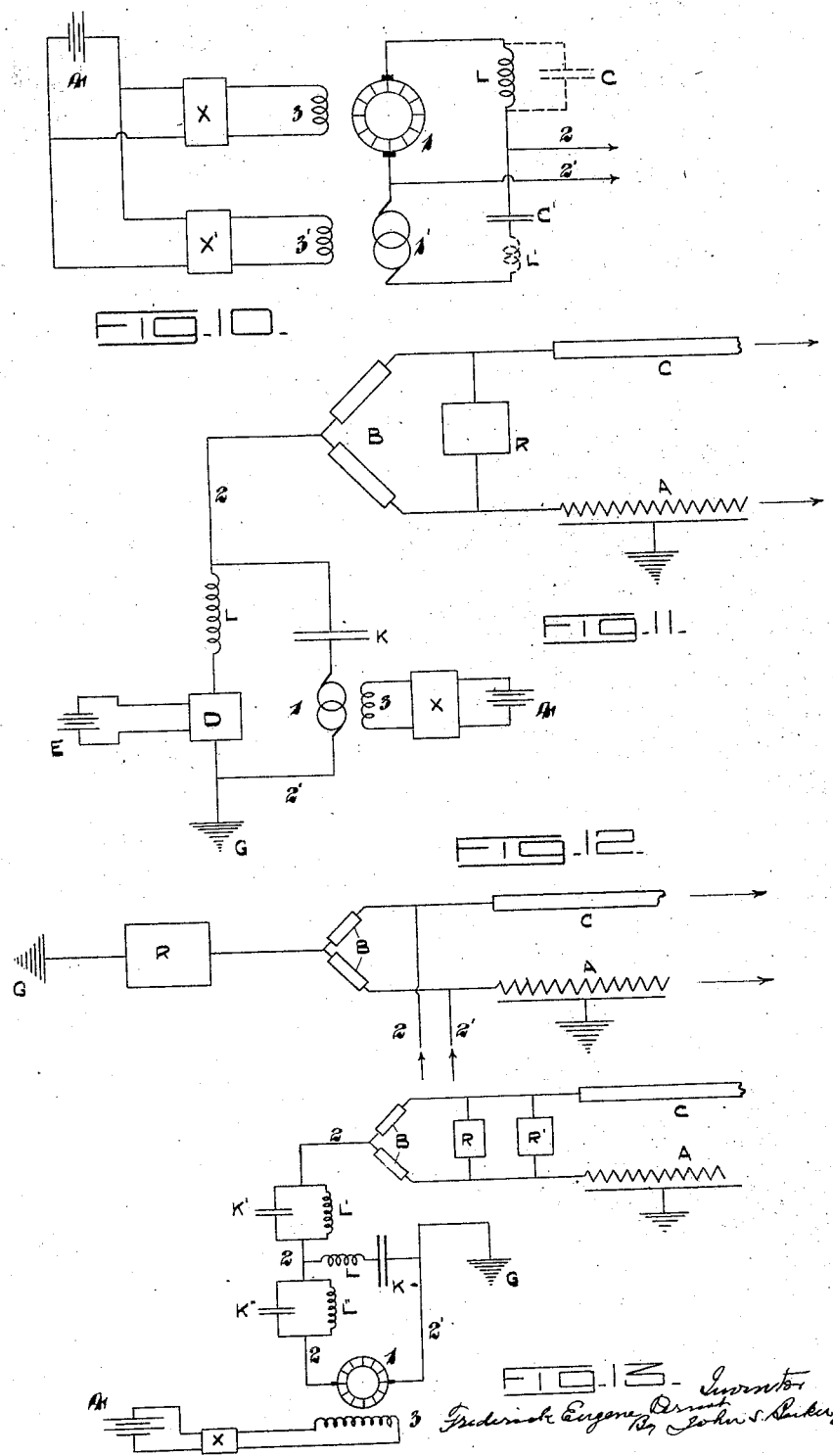

Patented June 29, 1926.

1,590,951

UNITED STATES PATENT OFFICE.

FREDERICK EUGENE PERNOT, OF LONDON, ENGLAND.

ELECTRICAL SIGNALING METHOD.

Application filed March 10, 1923, Serial No. 624,244, and in Great Britain June 15, 1922.

The invention herein described relates to improvements in methods of and means for electric signaling and has particular although not exclusive reference to submarine cable telegraphy.

The objects of the present invention are to reduce the disturbances arising from duplex operation, to eliminate expensive battery equipment for transmitting purposes, to simplify the transmitting system, and to aid in the operation of multiple-frequency multiplex.

The principal feature of the invention lies in the method whereby electric signal currents are produced and introduced into the cable or signaling system, and consists in the production of signal currents by operating upon the field system of an electric generator whose armature is connected to the signal transmission system.

A further feature of the invention consists in combining with the generator field circuit impedances or condensers arranged so as to produce the desired wave shape in the signal impulse.

A still further feature of the invention is found in the method whereby the two ends of the signal impulse are brought under control separately as to shape and whereby sparking at the transmitter contacts is avoided.

Another feature of the invention is found in the method whereby two or more generating systems are made to supply different-frequency currents as signals to a transmission system.

In order that this invention and its mode of application may be readily understood by those versed in the art reference will now be made to the accompanying drawings, wherein similar elements are similarly numbered throughout:—

Fig. 1 shows the application of the invention to the production of "double-current Morse" signals.

Fig. 2 shows different shapes of signals obtainable from the system of Figure 1.

Fig. 3 shows the application of the invention to the production of "cable-code" signals.

Fig. 4 shows an embodiment of the invention suitable for the production of "signal-current" Morse signals, or Morse signals in an alternating-current signaling system.

Fig. 5 shows a different embodiment of the invention for the production of Morse signals.

Fig. 6 shows an arrangement of transmitter or relay contacts whereby the ends of the signal are controlled separately and sparking is avoided.

Fig. 7 shows the shape of a signal impulse when no condenser is used across the field circuit and the transmitter arrangement of Figure 6 is used.

Fig. 8 shows how a number of different-frequency signaling generators combine their outputs into a single transmitting system.

Fig. 9 shows the application of the invention to the usual type of duplex bridge.

Fig. 10 shows a method of combining the different-frequency current outputs of two signaling generators so as to leave the operations of the generators mutually independent.

Fig. 11 shows the application of the invention to the superposition of alternating-current signals on the usual battery signals.

Fig. 12 shows an alternative type of duplex bridge whose use is facilitated by the application of the present invention.

Fig. 13 shows the invention applied in combination with external circuits to the usual duplex bridge in such a way as to perfect duplex balance conditions.

In Figure 1 the armature of a direct-current generator is shown at 1, and the conductors 2 and 2' lead from the brush terminals of the generator 1 to whatever system the electric signals are supplied to; for instance, to the earth and bridge apex in the usual duplex bridge system. The generator 1 is driven at constant speed and, as long as magnetic saturation is not reached in its magnetic circuit, delivers an output proportional to the field excitation current supplied to the field winding 3. A battery or other source 4 acts through a reversing switch (hand key, tape transmitter, relay, or other usual transmitting device) 5 to supply field excitation to the field 3 in the form of the usual double-current Morse signals. At 6 is a resistance, which may be taken to represent either the resistance of the field winding alone or the resistance of the field winding in combination with externally added resistance. At 8 is a resistance in series with the source 4, and at 7 is a capacity shunting across the field 3 and resistance 6. The functions of the elements 6, 7 and 8 are to shape the signals and also to prevent sparking at the transmitting key 5. Let the direction of battery connection be so chosen that when the key 5 is in the lower position negative or spacing E. M. F. is produced in the armature 1, and when in the upper position positive or marking E. M. F. is produced. Since the output E. M. F. is proportional to the field current it is sufficient to investigate the wave shape of the field current. Let E=E. M. F. of source 4.
R=resistance of element 8.
C=capacity of condenser 7.
$r$=combined resistance of field 3 and element 6.
L=self-inductance of field 3.
$i$=current in field 3.

Then, on changing from spacing to marking current, the field current at any instant is given by the equation $$i = \frac{2E}{R+r}\left\{-\cos \omega t + \frac{\alpha}{\omega}\sin \omega t\right\}\epsilon^{\alpha t} + \frac{E}{R+r} \quad (1)$$

wherein $t$=time counted from the instant of reversal, and $$\left.\begin{array}{l}\alpha = -\frac{1}{2}\left(\frac{r}{L}+\frac{1}{RC}\right) \\ \omega = \sqrt{\frac{1}{LC}-\left(\frac{r}{2L}-\frac{1}{2RC}\right)^2}\end{array}\right\} \quad (2)$$

For convenience, let $$k = \frac{\alpha}{\omega} \text{ and } \theta = \omega t \quad (3)$$

Also, for convenience in plotting curves, take the source 4 of such strength that $$\frac{E}{R+r} = 1.$$

Then the equation for field current becomes $$i = 1 - 2(\cos \theta - k \sin \theta)\epsilon^{k\theta} \quad (4)$$

Figure 2 shows the resulting curves from equation (4) by which transition from spacing to marking takes place for three different values of $k$, namely $$k = -\frac{0.5}{2\pi} \quad k = -\frac{2.04}{2\pi} \text{ and } k = -\frac{5.0}{2\pi}$$

The respective curves are designated by the numerals 0.5, 2.04, and 5.0. It is seen that any desired shape for the signal can be secured by adjusting the circuit elements to give the proper value to $k$. In the Figure 2 abscissae $\theta$ are plotted to degrees, and not to radians of angle as $\theta$ implies in the equations.

One of the advantages of this method of signaling is brought out clearly by the curves in Figure 2. The transition from spacing to marking begins at the initial instant I in Figure 2 without discontinuity in either the signal strength or its time-derivative. This is easily verified by evaluating the time-derivative of equation (4) at the instant $t=0$. In fact, at no time during signaling do any discontinuities occur. This is an important advantage in perfecting duplex balances to permit of greater refinement in cable operation.

In making a single dot the switch 5 in Figure 1 should be reversed back to the spacing position when the field current $i$ is at the peak of the curve in Figure 2 which for any value of $k$ falls on the line A at $\theta=180$ degrees or $\pi$ radians. Normally, dashes then end at the line B, or when $\theta=540$ degrees or $3\pi$. Thus, if the speed of signaling is $f$ dots per second, then $\omega$ should be $2\pi f$ in order to fulfil the above conditions. Knowing from the characteristics of the receiving instruments what shape of curve is desired, by an inspection of Figure 2 the value of $k$ becomes known. Then, by equations (2) and (3), in combination with the known values of L and $r$ for the generator field, the proper values of C and R can be calculated. The E. M. F. E is then taken to give the desired strength of signal at the speed at which the generator is driven.

To calculate C and R from the known quantities $\omega$, $k$ L, and $r$, take $\alpha=k\omega$. Then take auxiliary quantities defined by $$\left.\begin{array}{l}p = -\left(2\alpha+\frac{r}{L}\right) \\ q = \frac{L}{p}(\alpha^2+\omega^2)\end{array}\right\} \quad (5)$$

From these $$R = q-r \text{ and } C = \frac{1}{pR} \quad (6)$$

thus completing the solution.

As an example, suppose that L=0.5 henry and $r$=25 ohms. Let the speed of signaling be 32 dots per second, or $\omega$=200. Let $k$ be arbitrarily chosen to be $$\frac{-3.142}{2\pi} = -0.5.$$

Then by the equation above $\alpha=-100$, $p=150$, and $q=166.7$, from which R=142.7 ohms and C=46.7x10$^{-6}$ farads. These are reasonable values and give a well shaped signal.

The above completes the analysis for double-current Morse working according to Figure 1. Analyses for different kinds of shaping circuits are all readily worked out as above, according to the usual equations for the transient currents in electrical systems, so need not be given here any further.

In Figure 3 is shown an arrangement for transmitting cable-code signals by the proposed method. In transmitting by cable code the currrent is zero between signals, hence a slight modification is required in the shaping circuit. At 1 in Figure 3 is the armature of a direct-current generator, and 2 and 2′ are the conductors leading from it to the system utilizing or transmitting the signals. The generator field is at 3. A battery or other source at 4 connects through the usual type of reversing cable-code key 5 to the field 3. Resistances 6 and 8 along with the capacity 7 control the shape of the signals exactly as in the previous case. Resistance 6 may represent only the resistance of the field winding itself, if desired. An additional resistance 9 may be put in circuit to protect the source 4 from accidental short circuits, but when so used it causes the shape of the signal in building up to be different from the shape during the dying away process when the key 5 short circuits the field system. Keys 5′ and 5″ are for dots and dashes respectively and, in general, the key 5 may be taken to represent any usual type of cable code transmitter.

Figure 4 shows an arrangement adapted to transmit ordinary Morse signals, either as direct-current impulses from a direct-current generator or as trains of alternations from an alternating current generator. At 1 is the armature of either type of generator as the case may be. At 2 and 2′ are the connections leading from the armature to the system to which signals are to be supplied. Resistances 6 and 8 and the capacity 7 control the shaping in a fashion similar to the control described in reference to Figure 1. A source 4 acts through the key 5 to excite the field 3 in accordance with the signals desired. When the key 5 is in the position to the left, the source 4 excites the field, and when in the position to the right the field current dies away in a fashion determined by the circuit elements and the short circuit at the key 5. The resistance 6 may be only the resistance of the field winding itself.

A further modification of the control circuits is shown in Figure 5, whereby additional damping to oscillations in the field current is obtained and the two ends of the signal are controlled separately. As in the other figures, at 1 is shown the generator armature and 2 and 2′ are the conductors leading therefrom to the system utilizing the signals. At 3 is the field of the generator and at 6 is the resistance, either that of the field itself or in combination with externally added resistance. The condenser 7 aids in the shaping as described previously and, as in all of the cases described assists in preventing sparking at the transmitter contacts. The resistance 8 shunted around the condenser provides additional damping to the oscillations. The battery or source 4 connects to the key 5 through resistances 9 and 10 in such a manner that resistance 9 determines largely the manner of dying away of the signal and resistance 10 the manner of building up of the signal. A wide latitude in shaping conditions is thus obtained.

For direct-current signals it is usually desirable to use shapes like those shown in Figure 2, in all of which the field current is more or less oscillatory. It is the condenser which makes such oscillation possible, and the condenser is useful also in enabling key operations to take place without sparking. In the case of an alternating-current generator delivering trains of alternations as signals it is in some cases necessary to ensure that no oscillation takes place in the field current. If the alternator rotates steadily so as to produce a frequency $n$ and at the same time an oscillatory field of frequency $f$ exists, then in general the output from the alternator will contain three different frequencies, namely $$n, n+f, \text{ and } n-f.$$

The secondary frequencies $n+f$ and $n-f$ as resulting from the oscillation in the field may interfere in various ways with the further operations carried on in the electric system to which the signals of a nominal frequency $n$ are supplied. This is true notably in submarine cable multiplex working, where the frequency $n-f$, of a low value possibly, is readily transmitted over the cable and thereby disturbs low-frequency apparatus at the remote end of the cable.

It becomes desirable, therefore, to provide means for controlling the field current without using a condenser. Figure 6 shows an arrangement of transmitter contacts and resistances suitable for this. At 4 is the source for field excitation, and at 5 is the transmitter (hand key, relay, etc). 11 and 12 are the conductors leading to the field of the generator (not shown in the figure) and connecting directly thereto. Resistance 9 controls the dying away of the field current when the key 5 makes contact to the right on contact 14 and breaks contact with 13. Similarly, the resistance 10 controls the building up of the current when the key 5 moves to the left, making contact at 13 and breaking at 14 as shown in the figure. The key 5 and its contacts 13 and 14 can be arranged, as is well known in the art, in such a way that one contact makes before the other breaks, and hence avoids the sparking which otherwise would occur upon the interruption of the inductive field circuit.

Figure 7 shows the wave shape of field current corresponding to a signal impulse made with the key 5 in Figure 6. In Figure 7 time is taken as abscissa, and $y=$ signal strength as ordinate. The curve $y$ thus represents the field current, or the E. M. F. generated in the armature of a direct current generator, or (substantially) the envelope of the alternating E. M. F. produced in the armature of an alternating current generator. The rapidity of building up and dying away of the field current or signal, $y$, at the beginning and ending of the signal, and which rapidity may be measured by the angles of slopes of the curve $\theta_1$ and $\theta_2$ as shown in the figure depends upon the voltage E of the source 4 in Figure 6 and upon the self inductance of the field circuit, and also upon the total resistance included in circuit. If, in Figure 6 the resistance 10 added to the field circuit resistance is represented by R, and if the resistance 9 added to the field resistance is represented by $r$, then at the beginning of the signal $$\frac{dy}{dt} = \frac{E}{L}$$

and at the end of the signal $$\frac{dy}{dt} = \frac{r}{R}\left(\frac{-E}{L}\right)$$

where $y$ represents the field current. The steady value is $$y_0 = \frac{E}{R}.$$

Both ends of the signal are thus brought under control, and sparking is taken care of without the use of a condenser. By using this method of forming the signals in the output of an alternator a great advantage is gained in the multiplex operation of cables. The trains of alternations begin and end without any large one-sided transient effect. If the trains of signal alternations be formed by means of a key placed directly in the output circuit of the alternator armature, then such a large one-sided transient current is produced in the cable, and it is this transient which has resulted heretofore in making the multiplex working of submarine cables difficult. It is this elimination of the one-sided transient current which constitutes one of the greatest advantages of this key-in-the-field method of signaling in multiplex working with different frequencies.

It is not absolutely necessary that all alternating-current signaling be done with a key system like that shown in Figure 6. Condensers may be used with the alternator field provided such values are used that the secondary frequencies $n+f$ and $n-f$ as before described do not possess such values as to interfere with the desired working. Also, if with the condenser circuits a sufficient amount of damping be provided, then the secondary frequencies can be made to vanish.

In all of the foregoing description the condenser shown in the figures has referred to a condenser provided mainly for shaping purposes, and as a general rule, it will be found that such a condenser is of many micro-farads capacity. It is common practice to use small condensers, sometimes associated with resistances, placed around relay or transmitter contacts to prevent sparking. To be effective such condensers must be placed as close to the contacts as possible, with a minimum length of wire as connector. In none of the figures herewith have such auxiliary condensers been shown, for they have no essential bearing upon the present invention. No claim is made to the use of such spark-suppressing condensers, although their use is contemplated in connection with the present invention in accordance with the usual well-known methods.

Figure 8 shows how a number of different-frequency currents can be combined into one composite current, with the signals formed separately in each different-frequency component. In the figure, 1 is the armature of a direct current generator and 3 is its field. 1' and 1'' are the armatures of alternating-current generators and 3' and 3'' are their respective fields. At X, X' and X'' are transmitters and shaping circuits of any of the types heretofore described, and 4 is a source supplying current for excitation of the several generator fields through the transmitters. Separate and independent signaling can thus be done in the several generator fields. The direct-current armature 1 and one of the alternating-current armatures 1' are shown connected in series. The armature of the other alternator 1'' might also be connected in series with them, but it is supposed for sake of illustration that it is necessary to step up the voltage of the armature 1'' by means of a transformer T. The primary P of this transformer is then connected directly to the armature of the generator 1'' and the secondary S of the transformer is connected in series with the armatures 1 and 1' of the other generators. Thus, the three different-frequency E. M. F.'s produced in the three several generators combine to produce one composite current which is delivered to the transmission or other signal-utilizing system by way of conductors 2 and 2'. Methods for separating the several different-frequency signals comprised within the composite current thus produced do not fall within the scope of this application.

Figure 9 shows the simple application of two signaling sources to the usual type of duplex bridge. I and I' represent the armatures of two generators, say of a direct-current and alternating-current generator, respectively. 3 and 3' are their respective fields, X and X' the respective transmitter and shaping circuits as heretofore described, and 4 is the source for field excitation current. The two armatures 1 and 1' are connected in series and the composite current goes by way of conductors 2 and 2' to the apex of the usual duplex bridge B and to earth G, respectively. At R is represented en bloc the assemblage of receiving devices placed in the cross circuit of the bridge. At C is the cable and at A is the artificial line. The bridge arms B may be of any usual type.

Certain disadvantages attach to the putting of generator armatures directly in series as is shown in Figures 8 and 9. If something happens to one of the generators, then the signaling from the other generator is interrupted, so that each channel of signaling suffers from the combined interruptions in the two. Figure 10 shows a method whereby different frequency signals can be produced by the method described, and can be combined so as to leave each channel unaffected by disabilities in the other generator. At 1 and 1' are the two armatures of two generators of different frequency (one may be direct current). 3 and 3' are their respective fields and X and X' their respective transmitter and shaping circuits as described. 4 is the current source for field excitation. The two armatures 1 and 1' are not connected in series to the transmission system, but are connected in parallel thereto. 2 and 2' are the conductors leading to the transmission system, and the two generators are prevented from mutually short-circuiting by the inductance L and capacity C'. The inductance L allows the direct current signals from armature 1 to pass to conductors 2 and 2' without sensible impedance, but it prevents the alternating current signals produced by generator 1' from flowing through the armature 1. Similarly, condenser C' allows the alternating current signals to flow to lines 2 and 2', but prevents the direct-current signals from flowing through armature 1'. In this case two separate currents are actually produced and subsequently combined, whereas in Figures 8 and 9 separate E. M. F.'s are produced and combined, and the resultant current is produced by the resultant E. M. F. In Figure 10 the condenser C and self inductance L' may be added as shown by the dotted lines if a very great independence of action is desired for the separate generators. With the output circuits arranged as indicated in the figure, each generator is sensibly independent of the other, and troubles arising in one need not interrupt communication by signals from the other.

Figure 11 shows a useful application of the present method of signal production as applied to a single alternating-current generator for superposing alternating-current signals on the ordinary battery signals as at present used in cable operation. At B are represented the usual duplex bridge arms, at R the assemblage of receiving devices associated with the duplex bridge, at C is the cable and at A the artificial line. Ordinary battery signals are formed at the transmitter D from the battery E and are impressed between earth G and the apex of the bridge B through the conductor 2 and the self inductance L. At 1 is the armature of the alternating-current generator. 3 is the alternator field in which signals are formed by means of the battery or source 4 and transmitting and shaping circuit X similar to those described heretofore. The alternating-current signals pass through condenser K to the apex of the bridge B by way of conductor 2, and to earth by way of conductor 2'. The condenser K and self inductance L serve to keep the two signal sources, D and 1, separate in their actions as was described in connection with Figure 10.

Figure 12 shows another arrangement of the duplex bridge whose use is made feasible because of the greatly improved insulation possible in the case of systems utilizing signals produced in the armatures of generator as compared to the insulation which heretofore could be maintained between batteries and earth. There is nothing new about this type of bridge, which is developed from the usual type by simply interchanging the receiving and transmitting arms. The receiving devices are at R between earth G and the apex of the bridge arms B. C is the cable and A the artificial line. The transmitting devices (not shown) connect to the bridge by way of connectors 2 and 2'. This type of bridge offers some advantages as is well known, but it can only be used when the insulation between earth and the transmitting circuit is maintained constant and good. Since in the methods proposed here it is only the armature of the transmitting generator which need be connected to the transmission system, the insulation can be maintained as high as desired, and this type of bridge can be used.

Figure 13 shows the proposed method of signaling used in combination with apex circuits and the usual duplex bridge in a way which has been found very useful in the reception of different-frequency signals. The proposed method of signaling is used in this combination so as to reduce duplex disturbances to a minimum and thus enable the satisfactory reception of weak signals. At B are the arms of the usual duplex bridge, at C the cable and at A the artificial line. Different frequency receiving devices are shown at R and R' respectively. One or both of these receiving devices may be very sensitive, and it thus becomes important to reduce the disturbances arising from transmitting through the duplex bridge as much as possible. At 1 is the armature of the direct-current signaling generator. 3 is its field, and at X is the transmitter and shaping circuits as described heretofore, supplied with current from the source 4. From the armature 1 connector 2' goes to earth G, and connector 2 goes through the electric circuits K", L" and K', L' to the apex of the bridge B. The electric circuits above mentioned may consist of condensers and inductances in parallel, as shown in the figure, or, in general of lumped impedance of any suitable type, as for further example of simple inductances alone without the associated condensers. Between conductors 2 and 2' is connected a third electric circuit comprising inductance L and capacity K in series. This third circuit may be connected intermediate the two impedances in conductor 2 as shown in the figure, or it may be connected to the conductor 2 either at its bridge-apex end or at the armature-terminal end. It has been found in practice to be effective in each of these three positions. In general, this third circuit may consist of any suitable lumped impedance, a further example being that in which the inductance L is omitted and the capacity alone retained. The purpose of this combination of circuits between the generator armature and the bridge apex and earth which constitute the termini of the transmission system is to suppress current characteristics in the direct-current signals produced by the generator 1 which may, through the medium of imperfect duplex bridge balance, detrimentally affect the receiving devices R and R'. Theoretically, as pointed out in the mathematical analysis based upon Figure 1, the signals delivered by the armature 1 are free from discontinuities. This is substantially true in practice, but nevertheless, it has been found that a further gain in duplex balance conditions is obtained from the addition of circuits of the type just described.

I claim:—

1. In electrical signaling systems an electric generator, an armature and a field system therefor, connection from said armature to the transmission system, an electric current source, a transmitter controlling said source, impedances for shaping the signals, said source, said transmitter and impedances being located in the field system, said transmitter having two contacts arranged to complete a circuit including said source before breaking a circuit independent of said source.

2. In electrical signaling systems an electric generator, an armature and field system therefor, connection from said armature to the transmission system, an electric current source in said field system, connection from said source to a transmitter, a resistance intermediate said source and transmitter, connection from said transmitter to the field winding, a resistance in series therewith, and a condenser in parallel with said winding and transmitter, said condenser being located intermediate the transmitter and resistance.

3. In electrical signaling systems for the transmission of cable code signals an electric generator, an armature and field system therefor, connection from said armature to the transmission system, an electric current source located in said field system, connection from said source to a transmitter, connection from transmitter to the field winding, two resistances in one of the leads connecting said transmitter and winding, and a condenser in parallel with said winding, said condenser being located intermediate said resistances.

4. In electrical signaling systems for the transmission of "single-current" Morse signals an electric generator, an armature and a field winding therefor, connection from said armature to the transmission system, an electric current source located in said field system, connection from said source to a pair of transmitter contacts, a transmitter for making and breaking contact therewith, connection from said transmitter to one terminal of the field winding, two resistances located in said latter connection, connection from the remaining terminal of the winding to the source, and a condenser in parallel with said winding, said condenser being located intermediate said resistances.

5. In electrical signaling systems an electric generator an armature and a field system therefor, a field winding, connection from said armature to the transmission system, a source of electric current and a transmitter located in said latter system, said transmitter having a pair of contacts with said source connected to the transmitter contacts, a resistance included in each of the connections from said source to the contacts, a transmitter for opening and closing said contacts, connection from said transmitter to one terminal of the field winding, the remaining terminal of the winding connected to said source, a resistance located in the connection between the transmitter and winding, a condenser in parallel with said winding and located intermediate the resistance and transmitter and a resistance in parallel with said condenser.

6. In electrical signaling systems a plurality of electric generators, independent armatures and field systems therefor arranged to generate differing transmission frequencies, a line wire circuit, an induction coil having a primary and secondary winding, a number of said armatures in series with one another and in series with the secondary of said induction coil, the primary of said coil in circuit with another of the armatures, a source of electric current connected in parallel with said field systems, said armatures being connected in series with one another and in series with said secondary winding and connected to the transmission system, whereby a plurality of differing frequencies may be impressed on said line wire circuit.

7. In electrical signaling systems a plurality of different frequency electric generators, independent armatures and field systems therefor, a line wire circuit said armatures being connected in series, a duplex bridge, a connection to earth, said armatures being interposed between said bridge and said connection to earth, a source of electric current, connected in parallel with said field systems; impedances connected in said field systems and independent transmitters in said systems for impressing signals on said line circuit.

8. In electrical signaling systems different frequency electric generators, independent armatures and field systems therefor, a transmission systems, said armatures being connected in a closed circuit, leads from said circuit to the transmission system, impedances in said circuit intermediate the armatures and the leads, said field systems being connected in parallel with a source of electric current, impedances in said field systems and independent transmitters in said system for impressing signals upon said transmission system.

9. In electrical signaling a duplex bridge, two leads from the apex thereof to earth, an inductance in one of said leads, a direct current transmitter in series with said inductance and a source of electric current connected to said transmitter; a condenser in the second lead, an electric generator armature in series with said condenser, a field system to said armature, a source of electric current and impedances located in said latter system and a transmitter located in said field system.

10. In electrical signaling a duplex bridge, a connection from the apex thereof to earth, an electric generator armature located in said connection, a field system to said armature, a source of electric current, impedances and a transmitter located in said latter system, lumped impedances in series with said armature and located intermediate said armature and apex and lumped impedances connected in parallel with said armature and located intermediate to the impedances in series with said armature.

11. An electrical signaling system comprising a line wire circuit, an electric generator having an armature and a field, a connection between the armature and said line wire circuit, a source of energy for exciting said field, and a control circuit intermediate said field and said source of energy for impressing signals upon said line wire circuit, said control circuit consisting of a pair of resistances connected on opposite sides of said source of energy and terminating in contacts adjacent each other and a key arranged to alternately connect with one or the other of said contacts for alternately exciting said field and damping the residual excitation therein for producing signaling characters.

FREDERICK EUGENE PERNOT.